Sept. 11, 1956 W. D. VAN ZELM 2,762,586
ARRESTING GEAR FOR AIRCRAFT
Filed Aug. 30, 1951 3 Sheets-Sheet 1
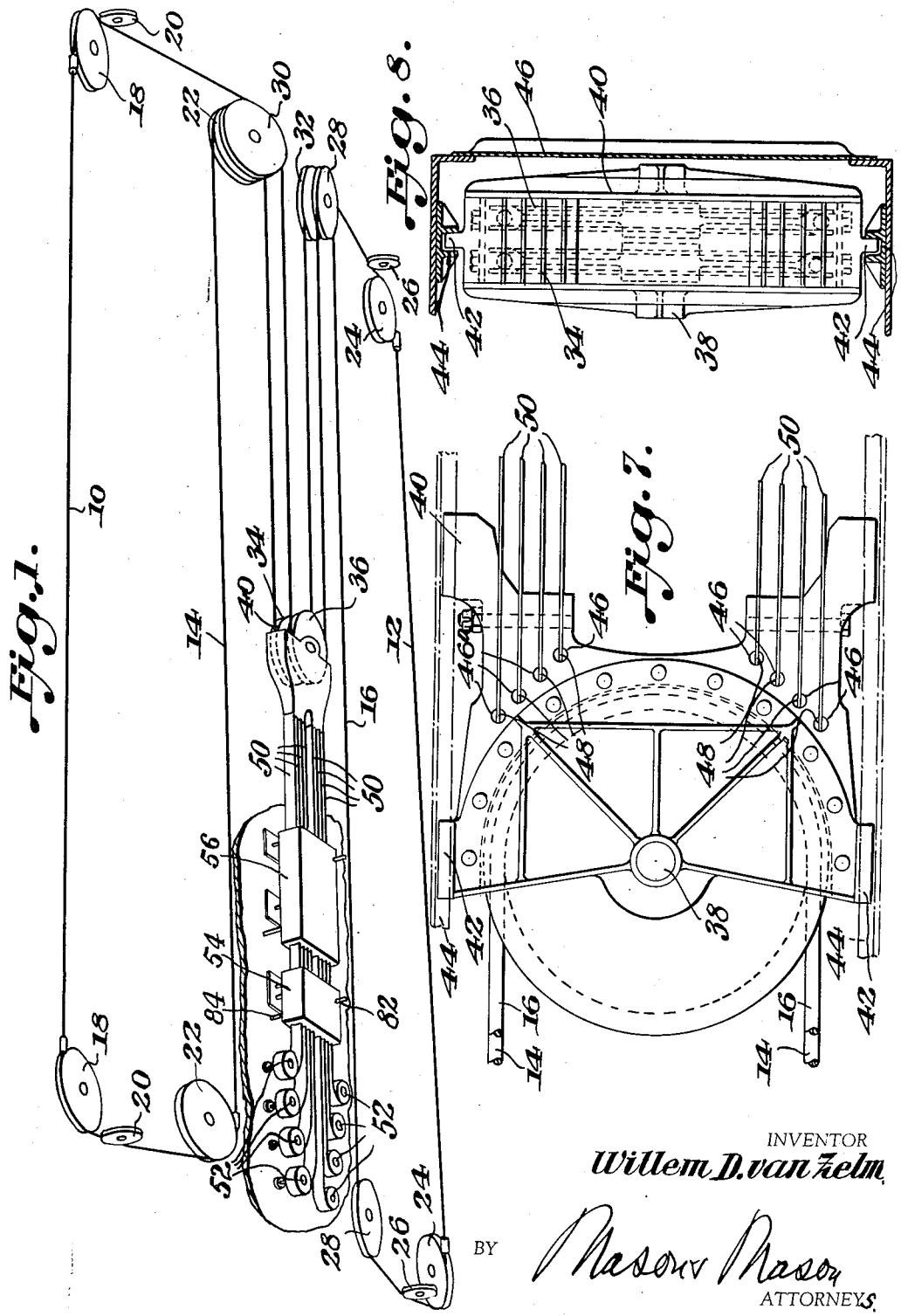
INVENTOR
Willem D. van Zelm
BY
Mason & Mason
ATTORNEYS

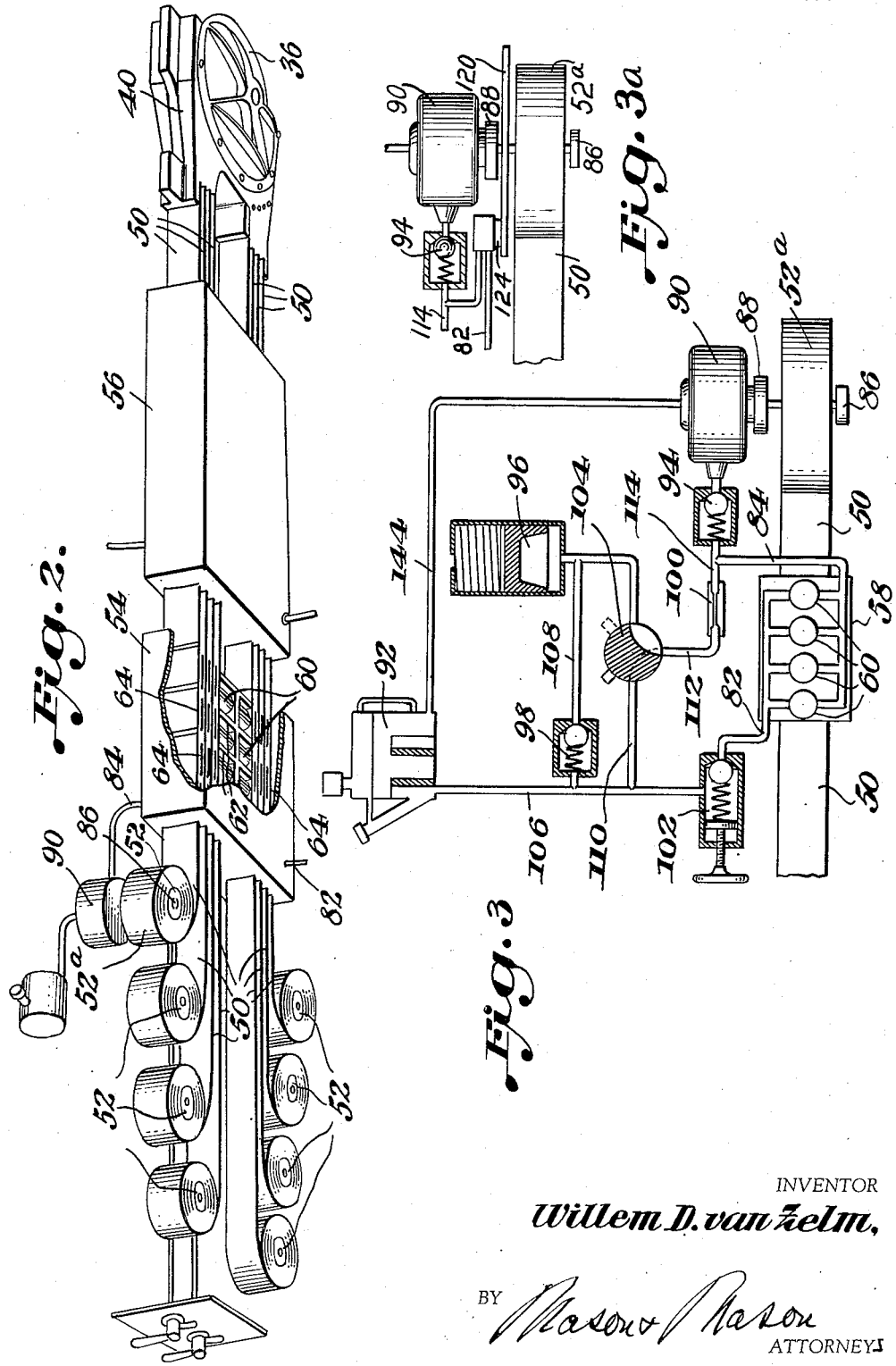

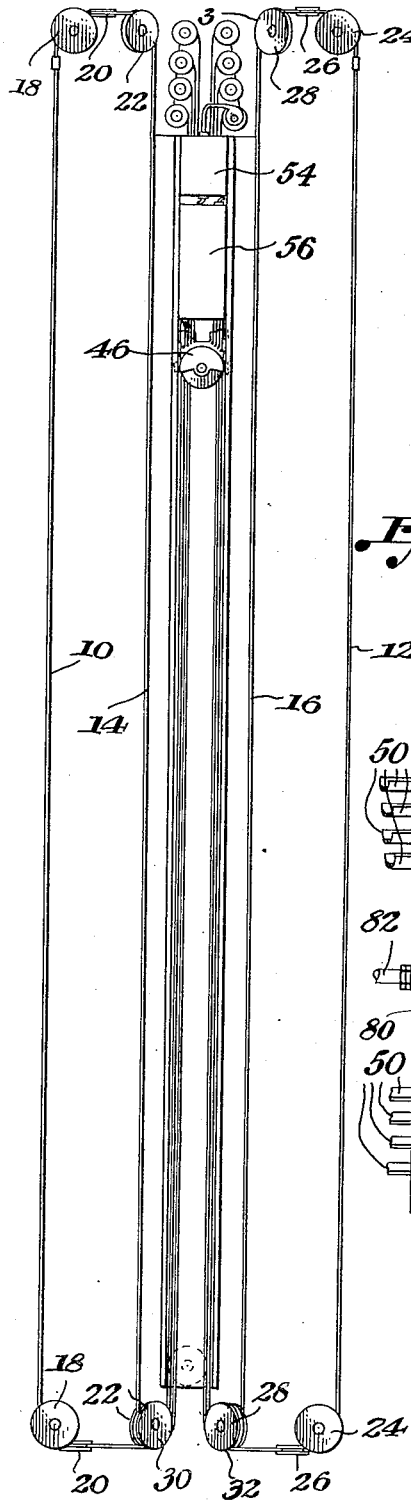
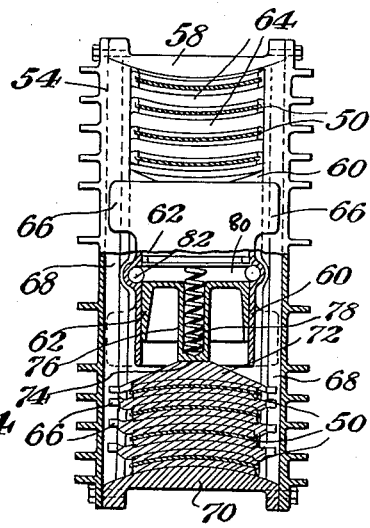
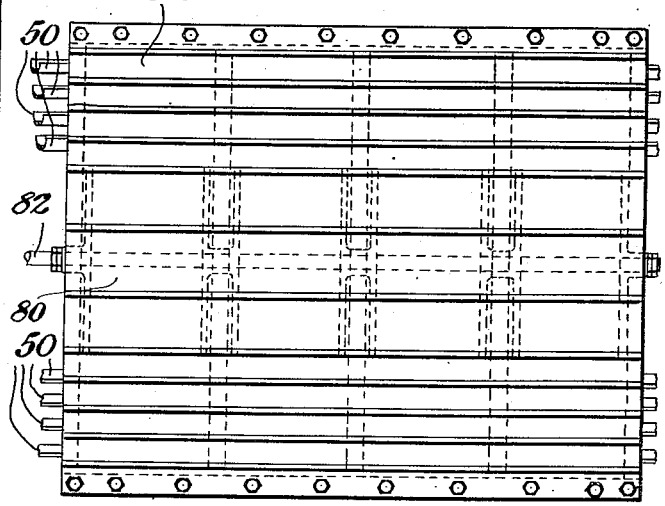

United States Patent Office 2,762,586
Patented Sept. 11, 1956

2,762,586

ARRESTING GEAR FOR AIRCRAFT

Willem D. van Zelm, Baltimore, Md.

Application August 30, 1951, Serial No. 244,420

16 Claims. (Cl. 244—110)

This invention relates to mechanism for arresting aircraft and is particularly constructed for arresting aircraft on the flight decks of carriers and on land.

An object of the invention is to decrease the weight of existing forms of aircraft arresting gear whilst increasing the braking characteristics of said arresting gear.

Another object of the invention is to provide an arresting gear having means for compensating for the increases in aircraft gross weights and landing speeds.

An additional object is to provide an arresting gear having an improved reduction of peak cable load and hook force for the same energy absorption and run-out as is used in present arresting gears.

Another object of the invention is to accomplish the last object by providing means for applying a constant maximum brake pressure, and therefore constant cable load, over the major portion of the run-out of the airplane, which pressure will however be reduced at the beginning and end of the run-out as a function of cable velocity in order to avoid jerky application of load, with the arresting gear held in the run-out position by the brake pressure remaining in the system.

Yet another object of the invention is to provide an arresting gear, independent of an external power source, which stores a portion of the energy absorbed in decelerating the landing airplane and later releases this stored energy as a means of returning the deck pendant to the taut (battery) position.

A further object of the invention is to provide an arresting gear which occupies a minimum space and which will require the minimum modification, if any, of the structure of existing carriers when installed on such carriers.

Yet another object of the invention is to provide an arresting gear which is constructed and adapted to be air dropped and quickly assembled at advance land bases for use by the Armed Forces.

An additional object is to provide an arresting gear which will absorb the maximum amount of energy within a minimum of movement of the aircraft, and which has a mechanical friction device providing improved energy absorption qualities.

These and other objects will be hereinafter described in the following specification and shown in the drawings.

In the drawings:

Figure 1 is a diagrammatic view of the apparatus (partial),

Figure 2 is an enlarged detail view of the braking portion of the apparatus shown in Figure 1 with one of the parts broken away, Figure 3 is a diagrammatic view with portions in section of the hydraulic brake system of the arrester (not shown in Fig. 1), Figure 3a is a fragmentary diagrammatic view showing the structure of Figure 3 with a disk and disk brake connected to the hydraulic system.

Figure 4 is a top plan view of the structure shown in Figure 1,

Figure 5 is a side elevation of the frictional brakes for the springs,

Figure 6 is a front elevational view of the structure shown in Figure 5 with parts shown in section, Figure 7 is a side elevational detail view of the spring holding mechanism, and Figure 8 is an end elevational view of the structure shown in Figure 7 with parts shown in section.

The arresting gear is provided with above-deck pendants, deck sheaves and purchase cables, some or all of which are of conventional design. The arresting engine comprises at least one but preferably a plurality of coiled springs of the type of, or constructed in accordance with, the teachings of Lermont Patents Nos. 2,301,960; 2,325,523; 2,326,470; 2,378,413; 2,441,707; 2,543,785 and 2,560,179. The construction and characteristics of such springs and their mountings is illustrated in Figures 1 and 3, and described in the last five lines of column 2 and first eleven lines of column 3 of Patent No. 2,543,785 supra.

Such springs have unusual characteristics which make them ideally suitable for use in aircraft arresting gear as indicated above. Moreover, other inherent characteristics which fit them for such use include their enormous extendability with substantially constant tension load and their ability to automatically return all of the engine gear parts to initial position upon release of braking pressure. The engine sheaves are attached to the ends of several of the flat coil steel, or other metal strips of the spring coils. When the aircraft reaches the landing strip, its tail hook engages the deck pendant and pulls these strips against a braking force which may well be described hereinafter. After the deck pendant has been removed from the aircraft's tail hook, the braking system is released, allowing the recoiling force of the springs to pull back the engine sheaves and restore the parts to their initial position. One type of braking system is so constructed as to apply a varying braking force to the moving tapes during the landing operation. Additionally, the braking system may be easily adjusted for aircraft having different weights and at different landing speeds which determine the energy to be absorbed.

In the drawings, deck pendants are indicated at 10 and 12, the purchase cables at 14 and 16 and the multiple sheave system preferably includes the pairs of deck sheaves 18, 20, 22, 24, 26 and 28 as well as the single sheaves 30 and 32 from which the cables are led directly to a pair of engine sheaves 34 and 36 mounted on shaft 38 of the engine sheave assembly 40.

The engine sheave assembly is provided with a pair of bosses 42 as best seen by reference to Figure 8. These bosses permit the engine sheave assembly to be guided in tracks 44 of the casing 46, during the back and forth movement of the sheave assembly which takes place once for each landing operation of an aircraft.

The sheave assembly, tracks and the arresting engine are all mounted below the landing surface, such as that of an aircraft carrier, or beneath or alongside the surface of the landing strip of an air field.

The engine sheave assembly 40 is provided with a number of clearance holes 46a depending upon the number of steel strips to be accommodated. In order to properly balance the assembly the number of strips used should be equal on each side of the shaft 38 as seen in Figure 7, in order to balance the pressures acting on the sheave assembly for causing smooth back and forth movements of the sheave assembly. These holes 46a anchor the opposite ends 48 of the spring ribbons 50 of the coils 52, which coils are fixedly mounted in position on shafts such as shown in Figure 3 of Patent No. 2,543,785.

The spring ribbons 50 pass from the coils through a brake mechanism 54 and the cooler 56, which preferably is a fluid cooling device, to the engine sheave assembly 40 as shown by Figures 1, 2 and 4.

Figures 2, 3, 5 and 6 show the detailed construction of the brake mechanism. Although the mechanism shown is preferable because of the ability to regulate braking pressure both for different sizes and types of aircraft and their loads, and to graduate the braking pressure during portions of each landing operation. Other types of brake operation means may be substituted for that shown, such as air regulating means or purely mechanical means.

There has been shown herein a hydraulic system. The brake assembly includes a casing 58 having any suitable number of double opposed pairs of cylinders 60 in which are located opposed pistons 62.

A plurality of friction shoes 64 composed of suitable friction material are interleaved with the spring ribbons 50. These shoes each have a pair of tongues 66 which slide in slots 68 on opposite sides of the brake casing as seen in Figure 6. Only the lower piston and connections are shown, in order to avoid unnecessary detail but it will be understood that the upper piston and its connections are duplicates of those shown in section. There is a base or anchor plate 70 and the uppermost friction shoe 72 of the lower set of shoes and the lowermost shoe of the upper set of shoes has a flat portion 74. Each piston is provided with a central cylindrical recess 76 and the spring 78, the ends of which seat in the recesses of each pair of opposed pistons, biases them away from each other and tends to cause the shoes to engage the spring ribbons 50.

Means for increasing and decreasing the pressure on the brake shoes consists of a mechanism which causes the pressure to be regulated partly automatically and partly manually during each landing operation. However, the manual regulation of brake shoe pressure may be manually set for a series of landing operations as hereinafter described.

Between the pairs of opposed pistons there is a space 80 for fluid together with fluid inlet and outlet connections 82 and 84 respectively. One of the spring reels 52a is drivingly mounted on a shaft 86 upon which is mounted a clutch 88, preferably a free-wheeling clutch, i. e., a clutch which drives only in one direction. Also mounted on the shaft is a pump 90 preferably of centrifugal design.

The hydraulic system further consists of a fluid reservoir and filter 92, a check valve 94 connected to the outlet of pump 90, a low pressure accumulator 96, a low pressure relief valve 98, a restrictor 100, a variable pressure manually operable relief valve 102, and a spring loaded manually operable control valve 104 and conduits 144, 106, 108, 110, 112 and 114 connected to these elements as shown in Figure 3.

This hydraulic system works as follows:

During a landing operation, the tail hook of the aircraft engages a deck pendant causing the uncoiling of the coiled springs. One of these, namely spring 52a rotates through clutch 88 the centrifugal pump 90. The pump draws fluid from tank 92 and forces the fluid through the check valve 94 to pressurize the system. The initial fluid flow charges accumulator 96 to a pressure set by the low pressure relief valve 98. As the rate of flow increases, the rate of additional pressure rise is governed by the restrictor 100 up to a predetermined value for the aircraft being landed, as set by the operator through control of the variable relief valve 102. This action then sets the brakes at the maximum constant pressure for the initial stage of the landing operation. As the brakes reduce the speed of cable travel, the pump delivery is likewise reduced until the variable pressure relief valve 102 closes. At this time the brake pressure will continue to reduce with runout speed until the aircraft has stopped with the arresting gear held in the runout position by the brake pressure remaining in the system. This pressure is set by the relief valve 98 and exerted by the accumulator 96. The pressure required to hold the cables in runout position and preventing retrograde movement of the parts is only enough to hold the spring ribbons with a load slightly in excess of their recoiling tension, say of approximately 600 lbs. each.

The operator returns the deck pendant to its taut or retracted position by operating valve 104 so as to connect pipes 110 and 112 to each other. The valve is spring loaded to the position shown in Figure 3 with the accumulator connected through pipe 112 to restrictor 100.

Operation of valve 104 to connect pipes 110 and 112 releases the pressure from the brakes, while retaining the stored energy in the accumulator. The springs now recoil pulling the system taut with, say about 1000 lb. cable tension. During this cycle the pump is stationary since the clutch 88 free wheels.

The operator can stop the rate of return of the deck pendant by releasing the control valve 104, which returns to the position of Figure 3, thus releasing brake pressure from the accumulator.

As stated heretofore, the increased load capacity and performance of carrier based aircraft has resulted in increases in aircraft gross weights and landing speeds. In order to obtain the optimum characteristics in an arresting gear it is important that, for a given amount of kinetic energy absorption, the maximum values of deceleration and the design loads of the arresting gear be kept to a minimum. In this manner the pilot reaction is more favorable and the weight of both aircraft and arresting gear are reduced.

An existing type of arresting gear provides an energy absorption of 8,300,000 ft. lbs. with 115 feet of purchase cable travel per side. The maximum cable load due to energy absorption (excluding peak dynamic loads due to cable deflection) is 60% of the minimum breaking strength of 93,000 lbs. or 55,800 lbs. Since the drag of the existing arresting gear engines is a function of the velocity of fluid flow through an orifice which is in turn dependent on cable runout speed, it follows that this load of 55,800 lbs. will be obtained only at the maximum cable velocity. It is obvious that the peak design loads could be reduced for the same energy absorption if the cable load could be held constant through a larger range of travel. The device of this invention accomplishes this object to a very marked degree. The mechanical friction device disclosed herein has this desirable characteristic, i. e., of essentially constant drag regardless of velocity. For the same kinetic energy absorption and runout the maximum design loads have been reduced 25% in the present construction, with a resultant reduction in loads throughout the arresting gear system. The system disclosed herein provides for a more gradual build-up of deceleration which is a very desirable feature from the view point of the pilot. A comparison with existing arresting gears will show that, with the improvements described herein, full advantage is taken of the inherent reduced loads and increased runout capabilities of this arresting gear. For instance, by adjusting the gear to give a 48,500 lb. tension load in the purchase cable and using the full 158 feet of allowable purchase cable travel, the kinetic energy absorption of the gear is increased to 13,500,000 ft. lbs., an increase of 63% over existing types of arresting gear, including the Mk V gear. Under these conditions the tail hook load is unchanged but the purchase cable load is reduced 13% and the airplane runout is changed from 157 ft. to 202 ft.

This type of spring performs several important functions, the foremost being the means for moving the gear through the return cycle to the landing position automatically, due to the inherent tension in the springs which is built up while the airplane is landing. In addition, the springs provide adequate surface area for the application of the braking force, the mass of material required for the absorption of heat energy, the means for dissipation of heat, and the application of tension load to the engine sheaves. As illustrated in the drawings, the installation includes springs arranged in parallel which apply a load to the engine sheave block equal to four times the required purchase cable tension. Thus an individual spring will carry a load equal to one half the load in the purchase cable, or less than 25,000 lbs. Since this is a low stress level of only one tenth of the ultimate strength, the life of the spring should be more than adequate for the purposes intended. It will be understood, of course, that any number of springs may be used, but as stated heretofore, these springs may be in even numbers so that an equal number will be on each side of the axle of the engine sheave.

An important consideration is to keep the temperature rise in the springs to a reasonable level. At a brake pull of 25,000 lbs. a one foot length of spring will absorb heat equivalent to 25,000 ft. lbs. of work. This results in an average temperature rise of 63° F. per landing cycle. While the springs can be cooled to a certain degree by means of the forced circulation of air, it is a safer procedure to use fluid cooling such as shown in Figures 1, 2 and 4. It will be understood that any type of fluid cooler may be employed. In addition to keeping the average temperature rise within reasonable limits, it is also important to avoid transient high local temperatures which could cause internal stresses leading to fatigue cracks. If the brake lining pressure was high, resulting in a very quick generation of heat, the temperature difference from the surface to the core of the spring could be in the order of 1,500° F. In order to avoid this high heating, the fluid cooler has been provided in order to limit the maximum temperature differential to less than 300° F. and by the use of large brake lining areas and the low braking pressure of 150 lbs. per sq. inch.

Due to the high static friction of the mechanical brake system shown herein, the controls must be such that the brake pressure will be automatically turned off except when the system is in actual operation and during the landing of aircraft. It is for this purpose that the present hydraulic system has been devised.

The arresting gear herein shown and described occupies a minimum of space, and when used on existing carriers, requires the least possible modification of structure for installation thereon.

Moreover, because of the lightness and compact arrangement of elements, the arresting gear of this invention is adaptable to have its components air dropped, and later assembled at an advance land base for use by the air and ground forces, due to the very low weight and small size of the component parts thereof.

The present invention is not limited to the brake system shown. Should it be determined that too much heat is developed as the result of the direct application of the braking means against the spring ribbons, thus causing deterioration of the metal of these ribbons, the brake mechanism 54 and the cooler 56 may be dispensed with. In the place of these elements each coil 52 may be drivingly mounted upon a shaft (not shown) in the same manner as coil 52a is mounted on shaft 86. The present invention encompasses therefore, braking means for the individually driven shafts upon which the spring coils 52 will be mounted either in substitution of the braking means herein shown, or in addition to said braking means.

The essence of the present invention is the provision of springs of the type shown in arresting gear to accomplish two purposes, first, to provide a means for absorbing and transmitting energy of a landing aircraft, and second, to provide a means for applying the stored energy in the springs to return the arresting gear to its original position for engagement by a following or subsequently landed aircraft. While the energy stored in the springs is relied upon to restore the parts to their initial position, a supplemental source of energy may be used if desired.

The term "aircraft" in the claims includes catapults.

The spring coils may drive shafts (not shown) upon which are mounted disks 120 and to which brake shoes 124 are applied, in place of the braking system shown, and in order to avoid injury to the ribbons due to overheating caused by direct application of brake shoes to the ribbons as shown herein.

While the foregoing specification describes and the drawings illustrate the specific details of the various embodiments of the invention, it is to be understood that the same is not limited by these details and is therefore susceptible to changes and modifications within the scope of the subjoined claims without a departure from the spirit of the invention.

I claim:

1. In a brake device for aircraft arresting gear of the type having a purchase cable extending transversely of the landing strip to be engaged by the landing hook of an aircraft comprising an arresting engine, said engine including: a plurality of metallic spring drums and spring ribbons leading therefrom, a brake means for resisting the unwinding rotative movements of said drums, and means for varying the pressure of said brake means, said spring drums being tensioned and biased to coiled position whereby to automatically return said arresting engine to initial position upon release of braking pressure following an arresting operation.

2. In a brake delay device for aircraft arresting gear comprising an arresting engine, said engine including: a plurality of metallic spring ribbons, a brake means associated with said ribbons, and hydraulic pressure means operatively connected with said brake means, said hydraulic pressure means further including a pump, means for driving said pump by one of said metallic ribbons, an accumulator, valve means and conduit means connecting said pump, accumulator, valve means, and said brake means to each other and to progressively apply fluid pressure to said brake means in proportion to the movement of said ribbons as said arresting gear absorbs the kinetic energy of the landing aircraft.

3. In a brake device for aircraft arresting gear comprising an arresting engine, said engine including: a plurality of metallic spring ribbons, a brake means and hydraulic pressure means operatively connected with said brake means, said hydraulic pressure means further including a pump, means for driving said pump by one of said metallic ribbons, an accumulator, valve means and conduit means connecting said pump, accumulator, valve means and said brake means to each other, said valve means including both a manually operated valve means and an automatically operated valve means.

4. In combination, an arresting gear including deck sheave means, purchase cable means engaging said deck sheave means; an arresting engine including an engine sheave assembly operatively engaged by said purchase cable means, a plurality of spring coils each having a spring ribbon operatively connected with said engine sheave and mechanical brake means in engagement with the ribbons of said spring coils, said brake means including a plurality of brake shoes interleaved with said ribbons and hydraulic means for actuating said brake means, said hydraulic means including a fluid circuit, a pump and valve means in said circuit, and drive means for said pump comprising a drive shaft and means for driving said drive shaft from one of said spring coils.

5. In combination, an arresting gear including deck sheave means, purchase cable means engaging said deck sheave means; an arresting engine including an engine sheave assembly operatively engaged by said purchase cable means, a plurality of spring coils each having a spring ribbon operatively connected with said engine sheave and mechanical brake means in engagement with the ribbons of said spring coils, said brake means including a plurality of brake shoes interleaved with said ribbons and hydraulic means for actuating said brake means, said hydraulic means including a fluid circuit, a pump and valve means in said circuit, and drive means for said pump comprising a drive shaft and means for driving said drive shaft from one of said spring coils and a free wheeling clutch on said shaft between said spring coil and said pump.

6. In combination, an arresting gear including deck sheave means, purchase cable means engaging said deck sheave means; an arresting engine including an engine sheave assembly operatively engaged by said purchase cable means, a plurality of spring coils each having a spring ribbon operatively connected with said engine sheave and mechanical brake means in engagement with the ribbons of said spring coils, said brake means including a plurality of pairs of opposed pistons, shoe means operatively connected to said pistons and adapted to engage said ribbons, said engine sheave assembly having a shaft, and means for attaching an equal number of spring ribbons on the opposite sides of said shaft.

7. In a brake device for aircraft arresting gear comprising an arresting engine, said engine including: drum means mounting spring ribbon means leading from said drum means, said drum means having friction brake means acting directly on said drum means for resisting the unwinding movements of said drums, said spring means being under tension and biased to rewound position whereby upon the release of said friction brake means the energy stored in said spring means during the arresting operation returns said arresting engine to its initial position.

8. In a brake device for aircraft arresting gear comprising an arresting engine, said engine including: drum means mounting spring ribbon means leading from said drum means, said drum means having friction brake means acting directly on said drum means for resisting the unwinding movements of said drums, said spring means being under tension and biased to rewound position whereby upon the release of said friction brake means the energy stored in said spring means during the arresting operation returns said arresting engine to its initial position, shaft means, means mounting said drum means and said friction brake means on said shaft means.

9. In a brake device for aircraft arresting gear comprising an arresting engine, said engine including a plurality of drums comprising a plurality of spring ribbons each forming a part of each of said spring drums, said ribbons being under tension whereby they are biased to positions wound on said drums, shaft means mounting said spring drums, and braking means mounted on said shaft means, said braking means including a braking element means adapted to apply braking force to each of said spring drums whereby when said braking element means is released from said spring drums, said drums, due to the energy stored in them during a landing operation, will automatically return said arresting engine to its initial or battery position.

10. In a brake device for aircraft arresting gear comprising an arresting engine, said engine including a plurality of spring drums comprising a plurality of spring ribbons each forming a part of each of said spring drums, said ribbons being under tension whereby they are biased to positions wound on said drums, shaft means mounting said spring drums, and braking means mounted on said shaft means, said braking means including a braking element means adapted to apply braking force to each of said spring drums whereby when said braking element means is released from said spring drums, said drums, due to the energy stored in them during a landing operation, will automatically return said arresting engine to its initial position, said braking element means comprising a disk member driven by each of said spring drums and a brake shoe for each of said disks adapted to frictionally engage said disk.

11. In a brake device for aircraft arresting gear comprising an arresting engine, said engine including: spring drum means comprising spring ribbon means leading from said spring drum means, said spring drum means having friction brake means acting directly on said spring drum means for resisting the unwinding movements of said drums, said spring ribbon means being under tension and biased to rewound position whereby upon the release of said friction brake means, the energy stored in said spring means during the arresting operation returns said arresting engine to its initial position, said friction brake means including at least one friction disk on said spring drum means and at least one brake shoe adapted to engage said friction disk.

12. An aircraft arresting gear for an aircraft carrier comprising a track mounted below the landing deck of said carrier, an arresting engine comprising a sheave assembly mounted for movement along said track, and a plurality of spring-steel ribbons, precoiled and tempered to tend to resist uncoiling mounted on drums adjacent one end of said track having the outer free ends thereof secured to said sheave assembly whereby said sheave assembly is biased to a position on said track adjacent said coiled steel ribbons, purchase cable means extending transversely above said landing deck and parallel thereto between pulley means, additional pulley means to guide said purchase cable means below deck and to a position generally parallel with said track throughout the length thereof and over the sheaves of said sheave assembly whereby the kinetic energy of a landing aircraft is absorbed by said purchase cable means moving said sheave assembly along said track and stored in said precoiled ribbons for the return of said sheave assembly and said cable means to initial positions.

13. An aircraft arresting gear for an aircraft carrier comprising a track mounted below the landing deck of said carrier, an arresting engine comprising a sheave assembly mounted for movement along said track, and a plurality of spring steel ribbons, precoiled and tempered to tend to resist uncoiling mounted on drums adjacent one end of said track having the outer free ends thereof secured to said sheave assembly whereby said sheave assembly is biased to a position on said track adjacent said coiled steel ribbons, brake means mounted to turn with said drums, purchase cable means extending transversely above said landing deck and parallel thereto between pulley means, additional pulley means to guide said purchase cable means below deck and to a position generally parallel with and between said track throughout the length thereof and over the sheaves of said sheave assembly whereby the kinetic energy of a landing aircraft is absorbed in part by said purchase cable means moving said sheave assembly along said track and stored in said precoiled ribbons for the return of said sheave assembly and said cable means to initial positions and the remainder absorbed by said brake means.

14. An arresting gear for an aircraft comprising a track, an arresting engine comprising a sheave assembly mounted for movement along said track, and a plurality of spring steel ribbons, precoiled and tempered to tend to resist uncoiling mounted on drums adjacent one end of said track having the outer free ends thereof secured to said sheave assembly whereby said sheave assembly is biased to a position on said track adjacent said coiled steel ribbons, purchase cable means extending transversely of the path of landing of said aircraft between pulley means, additional pulley means to guide said purchase cable means to a position generally parallel with said track throughout the length thereof and over the sheaves of said sheave assembly whereby the kinetic energy of a landing aircraft is absorbed by said purchase cable means moving said sheave assembly along said track and stored in said precoiled ribbons for the return of said sheave assembly and said cable means to initial positions.

15. An arresting gear for an aircraft comprising a track, an arresting engine comprising a sheave assembly mounted for movement along said track, and a plurality of spring steel ribbons, precoiled and tempered to tend to resist uncoiling mounted on drums adjacent one end of said track having the outer free ends thereof secured to said sheave assembly whereby said sheave assembly is biased to a position on said track adjacent said coiled steel ribbons, brake means mounted to turn with said drums, purchase cable means extending transversely of the path of landing of said aircraft between pulley means, additional pulley means to guide said purchase cable means to a position generally parallel with said track throughout the length thereof and over the sheaves of said sheave assembly whereby the kinetic energy of a landing aircraft is absorbed in part by said purchase cable means moving said sheave assembly along said track and stored in said precoiled ribbons for the return of said sheave assembly and said cable means to initial positions and the remainder absorbed by said brake means.

16. An energy absorbing arresting gear comprising a track, an arresting engine comprising a sheave assembly mounted for movement along said track, and a plurality of spring steel ribbons, precoiled and tempered to tend to resist uncoiling mounted on drums adjacent one end of said track having the outer free ends thereof secured to said sheave assembly whereby said sheave assembly is biased to a position on said track adjacent said coiled steel ribbons, brake means mounted to turn with said drums, purchase cable means extending transversely of the path of landing of said aircraft between pulley means, additional pulley means to guide said purchase cable means to a position generally parallel with said track throughout the length thereof and over the sheaves of said sheave assembly whereby the kinetic energy of a landing aircraft is absorbed in part by said purchase cable means moving said sheave assembly along said track and stored in said precoiled ribbons for the return of said sheave assembly and said cable means to initial positions and the remainder absorbed by said brake means.

References Cited in the file of this patent
UNITED STATES PATENTS

| | | |
|---|---|---|
| 1,458,710 | Kolczewski | June 12, 1923 |
| 1,716,670 | Sperry | June 11, 1929 |
| 2,151,704 | King | Mar. 28, 1939 |
| 2,360,495 | Hill | Oct. 17, 1944 |
| 2,400,587 | Livers | May 21, 1946 |
| 2,474,858 | Nicholson | July 5, 1949 |
| 2,483,655 | Schultz | Oct. 4, 1949 |
| 2,543,785 | Lermont | Mar. 6, 1951 |
| 2,609,192 | Lermont | Sept. 2, 1952 |

FOREIGN PATENTS

| | | |
|---|---|---|
| 617,498 | Great Britain | Feb. 7, 1949 |